United States Patent [19]
Doi et al.

[11] Patent Number: 5,708,584
[45] Date of Patent: Jan. 13, 1998

[54] VEHICLE RUNNING MODE DETECTING SYSTEM

[75] Inventors: Ayumu Doi; Yasunori Yamamoto; Hideki Nishitake; Tomohiko Adachi, all of Hiroshima-ken, Japan

[73] Assignee: Mazda Motor Corporation, Hiroshima, Japan

[21] Appl. No.: 525,218

[22] Filed: Sep. 8, 1995

[30] Foreign Application Priority Data

Sep. 14, 1994 [JP] Japan .................. 6-220294

[51] Int. Cl.⁶ .................................... B60T 8/32
[52] U.S. Cl. .................. 364/426.044; 364/461; 180/169; 180/170; 340/903
[58] Field of Search ............ 364/426.041, 426.044, 364/460, 461, 565; 180/167–170, 176–179; 123/350, 352; 342/454, 455; 340/903, 904

[56] References Cited

U.S. PATENT DOCUMENTS

| | | |
|---|---|---|
| 4,621,705 | 11/1986 | Etoh ........................... 180/169 |
| 5,053,979 | 10/1991 | Etoh ...................... 364/426.044 |
| 5,396,426 | 3/1995 | Hibino et al. ............ 364/426.044 |
| 5,420,792 | 5/1995 | Butsuen et al. ............... 364/461 |

FOREIGN PATENT DOCUMENTS 61-146644   7/1996   Japan .

*Primary Examiner*—Gary Chin
*Attorney, Agent, or Firm*—Sixbey, Friedman, Leedom & Ferguson, P.C.; Gerald J. Ferguson, Jr.

[57] ABSTRACT

In a vehicle running mode detecting system, a relative speed of a vehicle, equipped with the vehicle running mode detecting system, to a forward object is calculated on the basis of a time elapsed from a reference time based on which the time elapsed is measured and a change in the distance between the vehicle and the forward object during the time elapsed. Whether the vehicle is running in a constant distance mode where the distance between the vehicle and the forward object is kept substantially constant or in a varying distance mode where the vehicle is accelerating or decelerating relative to the forward object and the distance between the vehicle and the forward object is varying is determined on the basis of the change in the distance between the vehicle and the forward object. The reference time is updated less frequently when the vehicle is running in the constant distance mode than when the vehicle is running in the varying distance mode.

9 Claims, 5 Drawing Sheets

VEHICLE RUNNING MODE DETECTING SYSTEM

BACKGROUND OF THE INVENTION

1. Field of the Invention

This invention relates a vehicle running mode detecting system which is provided with a relative speed calculating means which calculates the relative speed of a vehicle to a forward object being ahead of the vehicle in the way on the basis of a time elapsed from a reference time and a change in the distance between the vehicle and the forward object during the time elapsed.

2. Description of the Related Art

As disclosed, for instance, in Japanese Unexamined Patent Publication No. 61 (1986)-146644, there has been known a vehicle running mode detecting system in which the relative speed of a vehicle to the forward vehicle running ahead thereof is calculated on the basis of changes in the distance between the vehicles during different time intervals, thereby eliminating necessity of additional relative speed calculating means.

However in the system, since the relative speed is uniformly calculated independently from the running mode of the vehicle, i.e., whether the vehicle is running substantially at a constant distance from the forward vehicle or at a decreasing or increasing distance from the forward vehicle, efficiency of calculating the relative speed is low.

SUMMARY OF THE INVENTION

In view of the foregoing observations and description, the primary object of the present invention is to provide a vehicle running mode detecting system which can detect the relative speed of a vehicle to a forward object (e.g., a forward vehicle) at a high efficiency.

In accordance with one aspect of the present invention, there is provided a vehicle running mode detecting system comprising a relative speed calculating means which calculates the relative speed of a vehicle, equipped with the vehicle running mode detecting system, to a forward object on the basis of a time elapsed from a reference time based on which the time elapsed is measured and a change in the distance between the vehicle and the forward object during the time elapsed, a running mode determining means which determines whether the vehicle is running in a constant distance mode where the distance between the vehicle and the forward object is kept substantially constant or in a varying distance mode where the vehicle is accelerating or decelerating relative to the forward object and the distance between the vehicle and the forward object is varying on the basis of the change in the distance between the vehicle and the forward object, and a reference time updating means which receives an output of the running mode determining means and updates the reference time less frequently when the running mode determining means determines that the vehicle is running in the constant distance mode than when the running mode determining means determines that the vehicle is running in the varying distance mode.

In an embodiment, the reference time is updated at predetermined intervals which are set longer when the running mode determining means determines that the vehicle is running in the constant distance mode than when the running mode determining means determines that the vehicle is running in the varying distance mode.

In another embodiment, the running mode determining means determines that the vehicle is running in the constant distance mode unless the distance to the forward object decreases or increases continuously.

In still another embodiment, the running mode determining means determines that the vehicle is running in the constant distance mode when the change in the distance to the forward object is small even if the distance to the forward object decreases or increases continuously.

In still another embodiment, the reference time updating means updates the reference time when the running mode determining means keeps determining that the vehicle is running in the constant distance mode for a time not shorter than a predetermined time.

In accordance with another aspect of the present invention, there is provided a vehicle running mode detecting system comprising a relative speed calculating means which calculates the relative speed of a vehicle, equipped with the vehicle running mode detecting system, to a forward object on the basis of a time elapsed from a reference time based on which the time elapsed is measured and a change in the distance between the vehicle and the forward object during the time elapsed, a running mode determining means which determines that the vehicle is running in a varying distance mode where the vehicle is accelerating or decelerating relative to the forward object and the distance between the vehicle and the forward object is varying on the basis of the change in the distance between the vehicle and the forward object, and a reference time updating means which receives an output of the running mode determining means and updates the reference time more frequently as the degree of acceleration or deceleration of the vehicle increases.

DESCRIPTION OF THE PREFERRED EMBODIMENT

Figure 1:
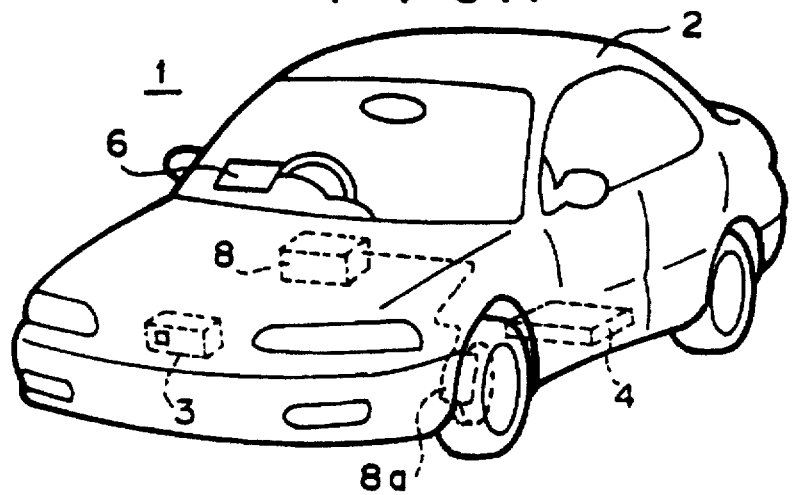
FIG. 1 is a perspective view of a vehicle equipped with a running control system employing a vehicle running mode detecting system in accordance with an embodiment of the present invention.

In FIG. 1, a vehicle 1 is equipped with a running control system comprising a radar head unit 3 mounted in the front of the vehicle body 2, a control unit 4, a vehicle speed sensor 5, a headup display 6, an alarm 7 (FIG. 2) and a vehicle control device 8.

The radar head unit 3 emits a pulse laser beam (as a radar wave) forward of the vehicle 1 from a source and receives reflected light beam reflected by a forward object in the way such as a vehicle, thereby measuring the distance from the vehicle 1 to the forward object. The radar head unit 3 is of a scan type which causes a pulse laser beam, which is small in width and like a sector in a vertical cross-section, to scan horizontally through a relatively wide angle.

Figure 2:
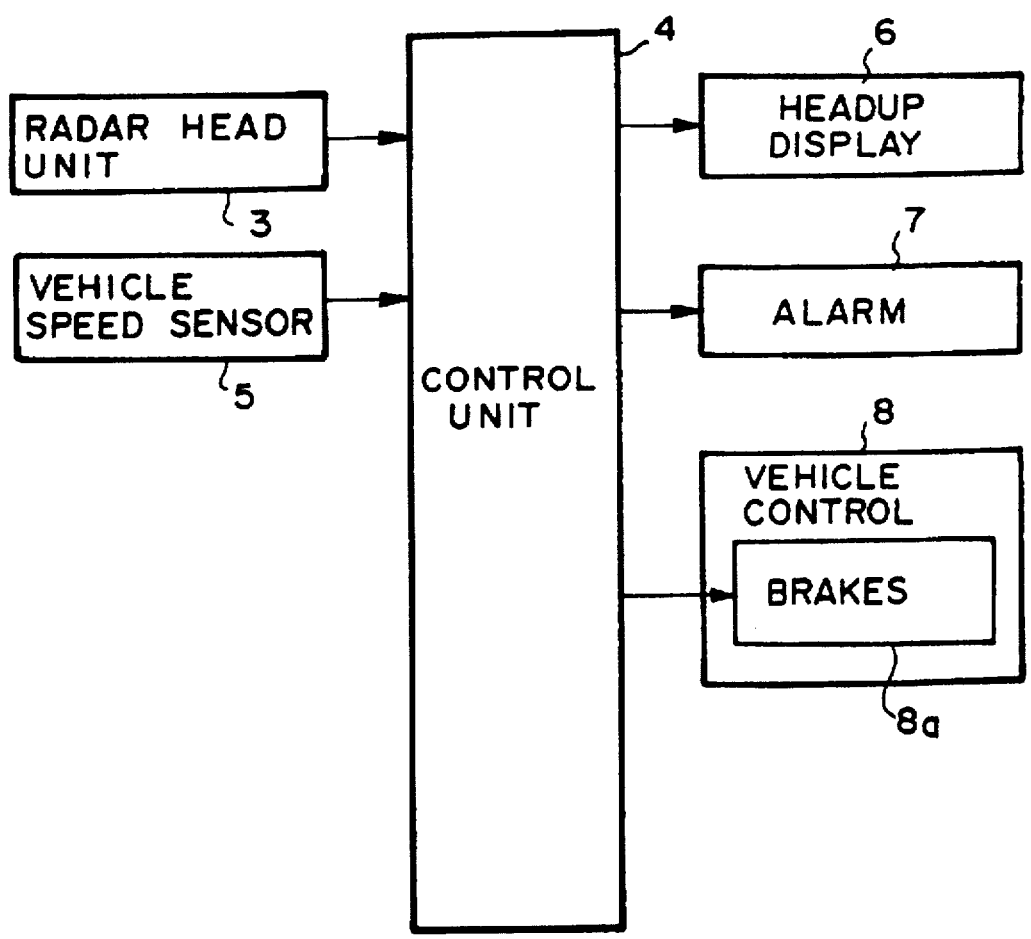
FIG. 2 is a schematic block diagram of the running control system.

As shown in FIG. 2, signals from the radar head unit 3 and the vehicle speed sensor 5 which detects the running speed of the vehicle 1 are input into the control unit 4 and the running mode of the vehicle 1 is determined by the control unit 4 and shown by the headup display 6. When it is determined that the forward object is an obstruction for the vehicle 1 to clear, the alarm 7 operates and the vehicle control device 8 automatically causes brakes 8a of the vehicle 1 to operate to decelerate the vehicle 1.

Figure 3:
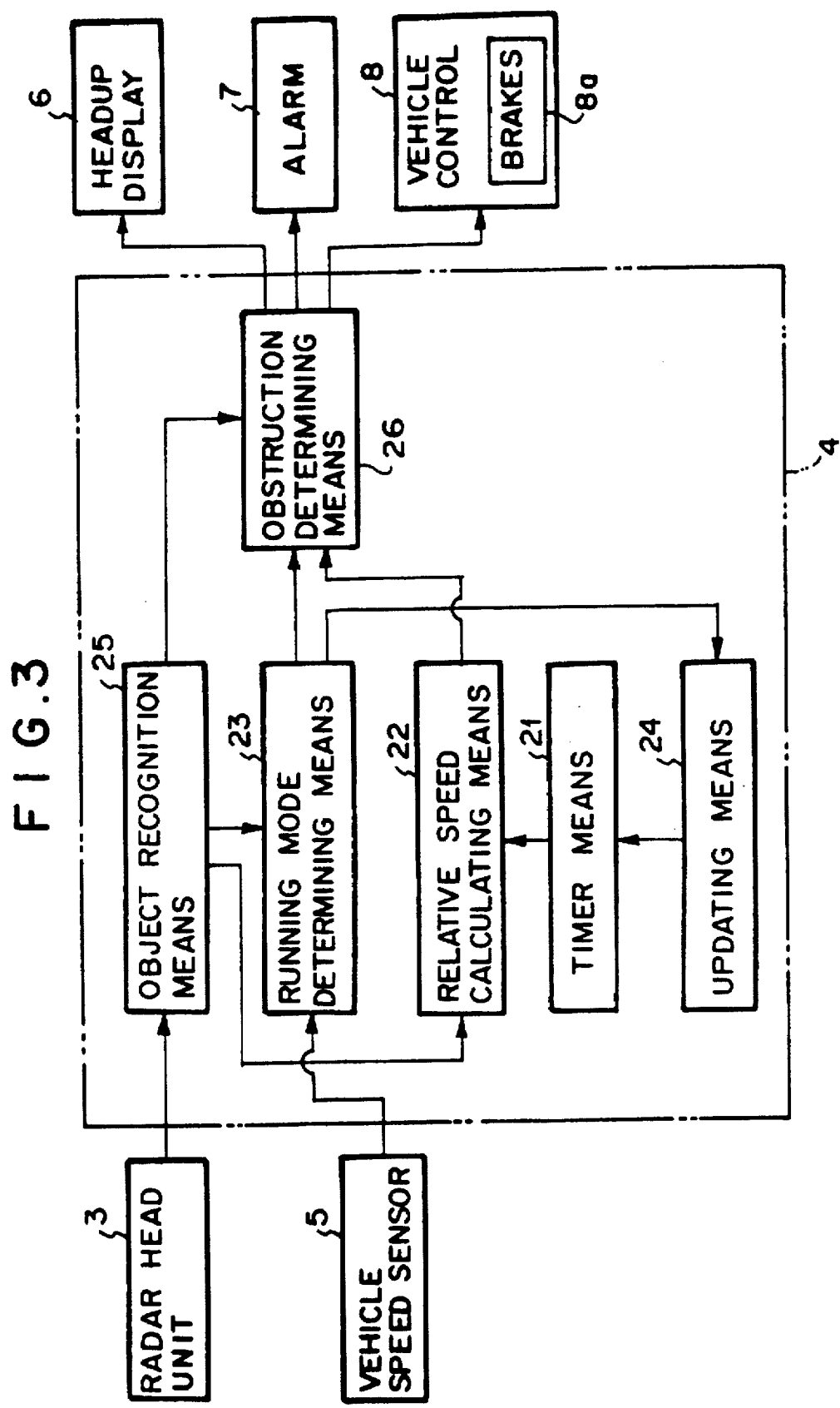
FIG. 3 is a block diagram of the control unit.

As shown in FIG. 3, the control unit 4 comprises an object recognition means 25 which receives a signal from the radar head unit 3 and recognizes a forward object such as a forward vehicle in the way of the vehicle 1, a relative speed calculating means 22 which receives signals from the object recognition means 25 and a timer means 21 and calculates the relative speed of the vehicle 1 to the forward object on the basis of a time elapsed from a reference time based on which the time elapsed is measured and a change in the distance between the vehicle 1 and the forward object during the time elapsed, a running mode determining means 23 which receives outputs of the object recognition means 25 and the vehicle speed sensor 5 and determines whether the vehicle 1 is running in a constant distance mode where the distance between the vehicle 1 and the forward object is kept substantially constant or in a varying distance mode where the vehicle 1 is accelerating or decelerating relative to the forward object and the distance between the vehicle 1 and the forward object is varying, and a reference time updating means 24 which receives an output of the running mode determining means 23 and sets the reference time updating frequency by the relative speed calculating means 22 lower when the running mode determining means 23 determines that the vehicle 1 is running in the constant distance mode than when the running mode determining means 23 determines that the vehicle 1 is running in the varying distance mode.

The control unit 4 further comprises an obstruction determining means 26 which receives outputs of the object recognition means 25 and the relative speed calculating means 22 and determines whether the forward object is an obstruction for the vehicle 1 to clear.

The running mode determining means 23 determines that the vehicle is running in the constant distance mode unless the distance to the forward object decreases or increases continuously and also determines that the vehicle is running in the constant distance mode when the change in the distance to the forward object is small even if the distance to the forward object decreases or increases continuously. Further the running mode determining means 23 determines whether the vehicle 1 is accelerating, decelerating or running at a constant speed on the basis of the signal from the vehicle speed sensor 5.

The reference time updating means 24 updates the reference time when the running mode determining means 23 keeps determining that the vehicle 1 is running in the constant distance mode for a time not shorter than a predetermined time in order to prevent deterioration in accuracy of detecting the relative speed.

The control by the control unit 4 will be described hereinbelow with reference to FIG. 4 assuming that a forward vehicle is recognized as the forward object. In this particular example, the object recognition means 25 detects the vehicle-to-vehicle distance (the distance between the forward vehicle and the vehicle 1) at regular intervals on the basis of the signal from the radar head unit 3. In the following description, L(i) denotes the current vehicle-to-vehicle distance.

Figure 4:
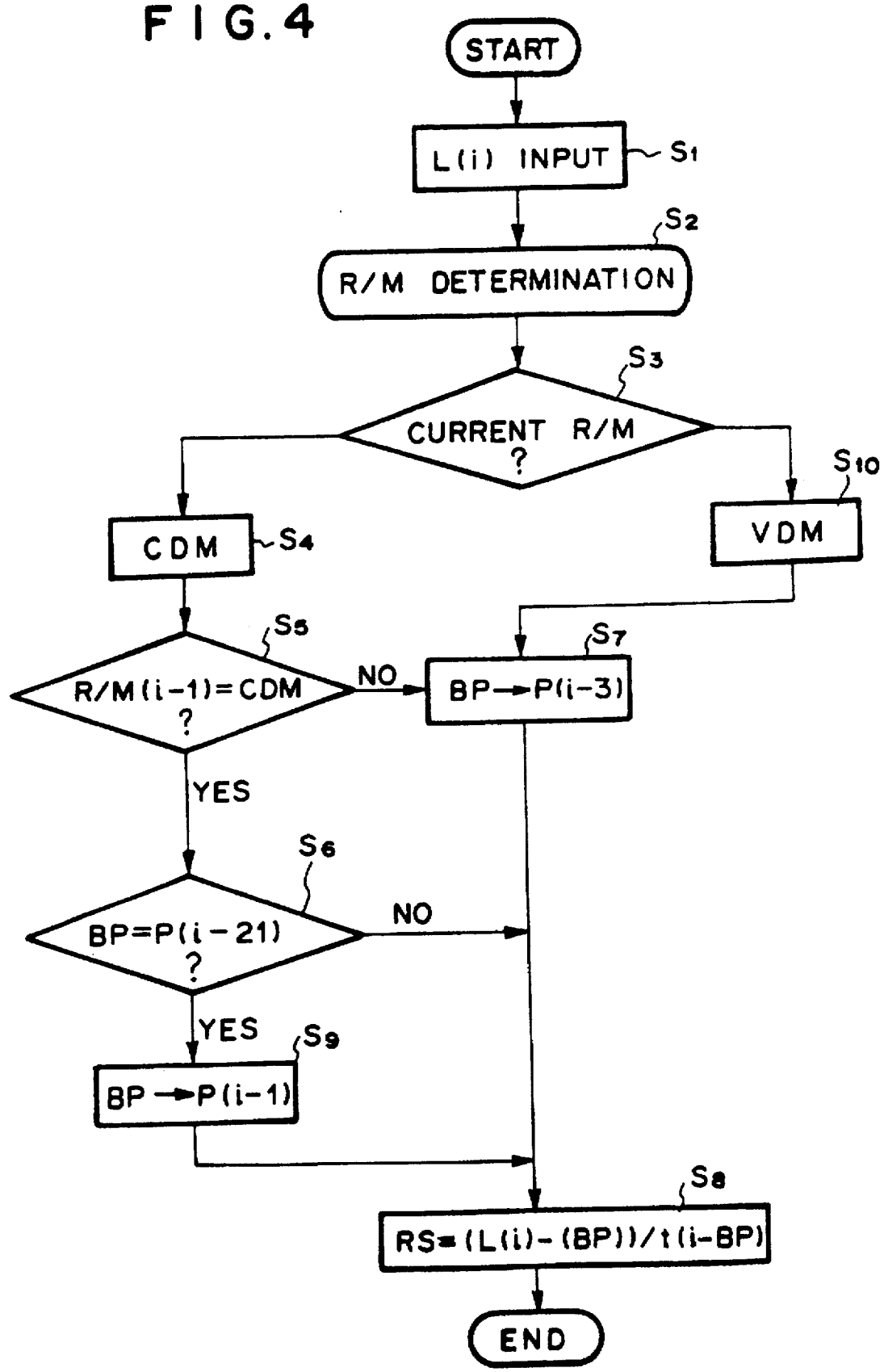
FIG. 4 is a flow chart for illustrating the basic control of the control unit.

In FIG. 4, the vehicle-to-vehicle distance L(i) is input. (step S1) More particularly, the last 19 vehicle-to-vehicle distances L(i-19) to L(i-1) are stored by the object recognition means 25.

Then the running mode (R/M) of the vehicle 1 is determined on the basis of the change in the vehicle-to-vehicle distance calculated on the basis of the output of the object recognition means 25 and the running speed of the vehicle 1 detected by the vehicle speed sensor 5. (step S2) Then the running mode determining means determines whether the current running mode is the constant distance mode (CDM) or the varying distance mode (VDM). (step S3)

When it is determined that the current running mode is constant distance mode, it is registered in the obstruction determining means 26. (step S4) Thereafter it is determined whether the preceding running mode (the running mode one point before) was the constant distance mode. (step S5) When it is determined that the preceding running mode was also the constant distance mode, it is determined that the current base point (or the reference time) from which the time elapsed is measured is the point which is 21 point before. When it is determined in step S5 that the preceding running mode was not the constant distance mode, that is, when the preceding running mode was the varying distance mode, the base point is updated to the point 3 point before (step S7) and then the relative speed is calculated according to the following formula (step S8).

$$Rs = \{L(i) - L(BP)\}/t(i - BP)$$

wherein Rs represents the relative speed, L(i) represents the vehicle-to-vehicle distance at the current point, L(BP) represents the vehicle-to-vehicle distance at the base point BP and t(i–BP) represents the time difference (the time elapsed) between the current point and the base point BP.

Figure 6:
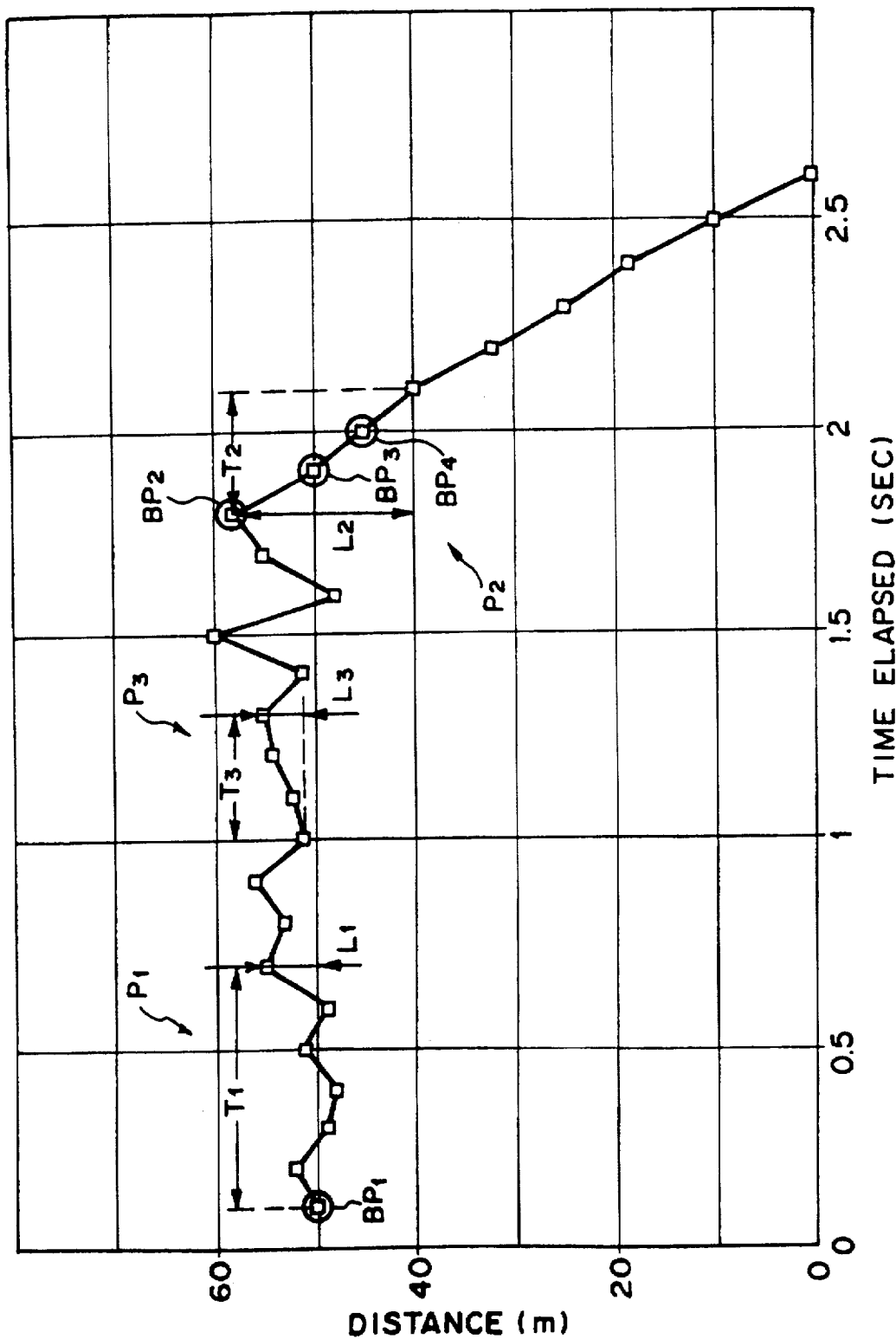
FIG. 6 is a view for illustrating the manner of determining the running mode of the vehicle.

For example, assuming that the time elapsed from the base point BP1 is T1 and the change in the vehicle-to-vehicle distance during the time T1 is L1 in the part indicated at P1 in FIG. 6, the relative speed Rs is L1/T1.

When it is determined in step S6 that the current base point is the point which is 21 point before, the base point is updated to the point 1 point before (step S9) and then step S8 is executed. That is, when the running mode is the constant distance mode at successive tow points including the current point, the base point is not updated until the running mode keeps being the constant distance mode. In this particular embodiment, the base point is updated every 21 points when the running mode keeps being the constant distance mode.

When it is determined in step S3 that the current running mode is the varying distance mode, the step 7 is executed and the base point BP is updated to the point 3 point before after that the current running mode is the varying distance mode is registered in the obstruction determining means 26 in step S10. For example, when the vehicle-to-vehicle distance is decreasing, i.e., when the vehicle 1 is accelerating relative to the forward vehicle as in the part indicated at P2 in FIG. 6, the base point BP is changed from BP1 to BP2 and the relative speed Rs is L2/T2 assuming that the time elapsed from the base point BP2 is T2 and the change in the vehicle-to-vehicle distance during the time T2 is L2. Thus when the varying distance mode continues, the base point BP is constantly updated to BP3, BP4 and so on so that the relative speed Rs can be calculated following abrupt change in the same.

Figure 5:
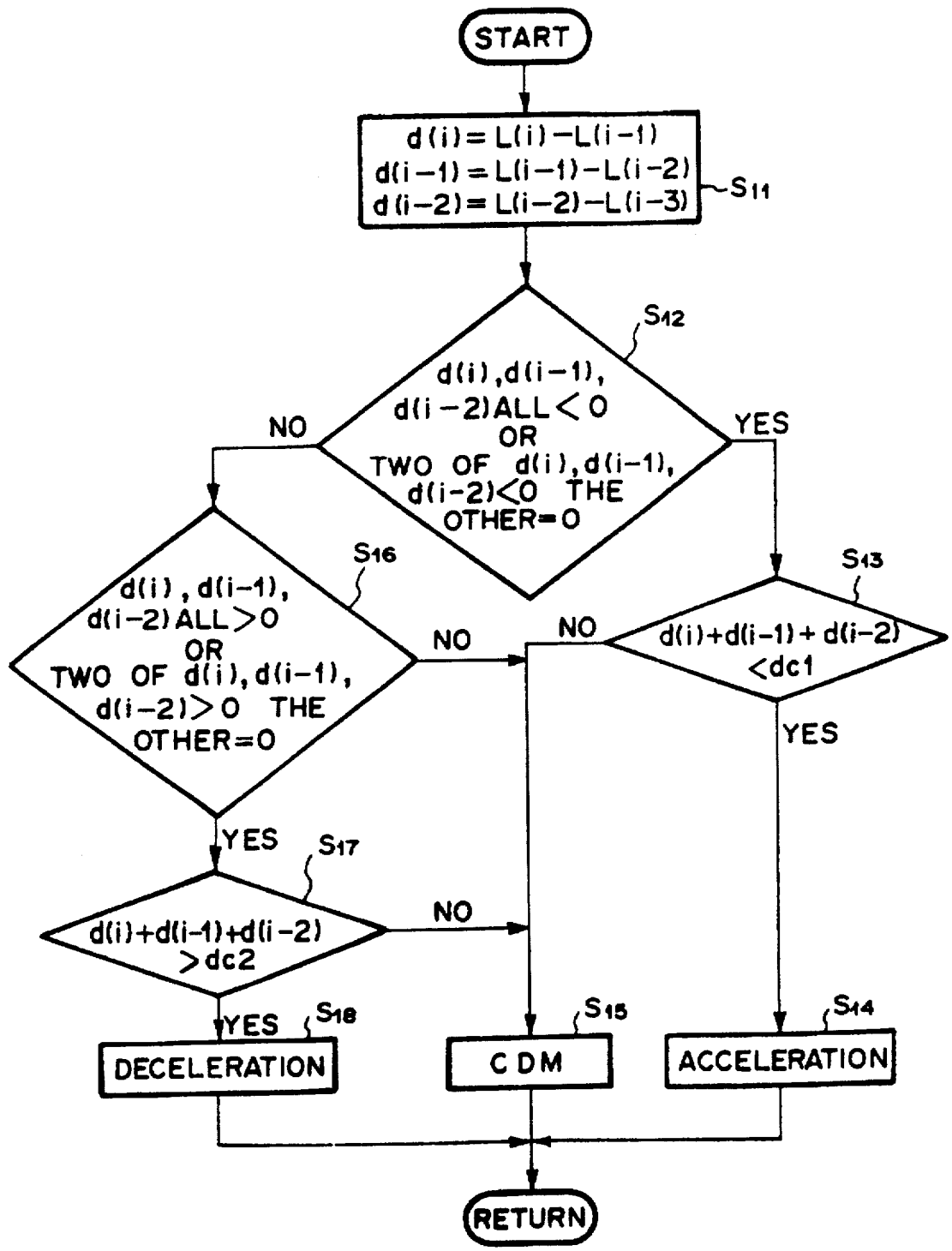
FIG. 5 is a flow chart for illustrating the manner of determining the running mode of the vehicle.

In step S3, the running mode is determined in the manner shown in FIG. 5. That is, the changes in the vehicle-to-vehicle distance between each of last three points and the preceding point d(i), d(i-1) and d(i-2) are calculated as follows. (step S11)

$d(i)=L(i)-L(i-1)$ $d(i-1)=L(i-1)-L(i-2)$ $d(i-2)=L(i-2)-L(i-3)$

Then it is determined whether or not the changes d(i), d(i-1) and d(i-2) are all negative or two of them are negative with the other being 0. (step S12) When it is determined that the changes d(i), d(i-1) and d(i-2) are all negative or two of them are negative with the other being 0, it is determined whether the sum of the changes d(i), d(i-1) and d(i-2) is smaller than a predetermined value dc1. (step S13) When it is determined the former is smaller than the latter, that is, when the change in the vehicle-to-vehicle distance is large, it is determined that the vehicle 1 is accelerating relative to the forward vehicle. (step S14) Otherwise it is determined that the vehicle 1 is running at a constant distance from the forward vehicle since the degree of acceleration is low. (step S15)

When it is not determined in step S12 that the changes d(i), d(i-1)) and d(i-2) are all negative or two of them are negative with the other being 0, it is determined whether or not the changes d(i), d(i-1) and d(i-2) are all positive or two of them are positive with the other being 0. (step S16) When it is determined that the changes d(i), d(i-1) and d(i-2) are all positive or two of them are positive with the other being 0, it is determined whether the sum of the changes d(i), d(i-1) and d(i-2) is larger than a predetermined value dc2. (step S17) When it is determined the former is larger than the latter, that is, when the change in the vehicle-to-vehicle distance is large, it is determined that the vehicle 1 is decelerating relative to the forward vehicle. (step S18) Otherwise it is determined that the vehicle 1 is running at a constant distance from the forward vehicle since the degree of deceleration is low. (step S15)

Thus when all the changes in the vehicle-to-vehicle distance in the last three intervals are not of the same sign (including 0), the running mode is determined to be the constant distance mode and the relative speed is calculated without changing the base point. Further even if all the changes in the vehicle-to-vehicle distance in the last three intervals are of the same sign (including 0), the change in the vehicle-to-vehicle distance is determined to be not abrupt and the running mode is determined to be the constant distance mode if the absolute value of the sum of the changes is smaller than a predetermined value. For example, in the part indicated at P3 in FIG. 6, though the three successive changes in the vehicle-to-vehicle distance are all positive, it is determined that the running mode is the constant distance mode since the change L3 in the elapsed time T3 is small. In this case, the relative speed is L3/T3.

Thus in the vehicle running mode detecting system of the present invention, the reference time is updated less frequently when the vehicle is running in the constant distance mode where the relative speed of the vehicle to the forward object need not be calculated so accurately than when the vehicle is running in a varying distance mode where the relative speed should be calculated accurately. Accordingly, the efficiency of calculating the relative speed can be improved.

What is claimed is:

1. A vehicle running mode detecting system comprising a relative speed calculating means which calculates the relative speed of a vehicle, equipped with the vehicle running mode detecting system, to a forward object on the basis of a time elapsed from a reference time based on which the time elapsed is measured and a change in the distance between the vehicle and the forward object during the time elapsed, a running mode determining means which determines whether the vehicle is running in a constant distance mode where the distance between the vehicle and the forward object is kept substantially constant or in a varying distance mode where the vehicle is accelerating or decelerating relative to the forward object and the distance between the vehicle and the forward object is varying on the basis of the change in the distance between the vehicle and the forward object, and a reference time updating means which receives an output of the running mode determining means and updates the reference time less frequently when the running mode determining means determines that the vehicle is running in the constant distance mode than when the running mode determining means determines that the vehicle is running in the varying distance mode.

2. A vehicle running mode detecting system as defined in claim 1 in which said reference time updating means updates the reference time at predetermined intervals which are set longer when the running mode determining means determines that the vehicle is running in the constant distance mode than when the running mode determining means determines that the vehicle is running in the varying distance mode.

3. A vehicle running mode detecting system as defined in claim 2 in which the running mode determining means determines that the vehicle is running in the constant distance mode unless the distance to the forward object decreases or increases continuously.

4. A vehicle running mode detecting system as defined in claim 3 in which the running mode determining means determines that the vehicle is running in the constant distance mode when the change in the distance to the forward object is small even if the distance to the forward object decreases or increases continuously.

5. A vehicle running mode detecting system as defined in claim 4 in which the reference time updating means updates the reference time when the running mode determining means keeps determining that the vehicle is running in the constant distance mode for a time not shorter than a predetermined time.

6. A vehicle running mode detecting system as defined in claim 1 in which the running mode determining means determines that the vehicle is running in the constant distance mode unless the distance to the forward object decreases or increases continuously.

7. A vehicle running mode detecting system as defined in claim 1 in which the running mode determining means determines that the vehicle is running in the constant distance mode when the change in the distance to the forward object is small even if the distance to the forward object decreases or increases continuously.

8. A vehicle running mode detecting system as defined in claim 1 in which the reference time updating means updates the reference time when the running mode determining means keeps determining that the vehicle is running in the constant distance mode for a time not shorter than a predetermined time.

9. A vehicle running mode detecting system comprising a relative speed calculating means which calculates the relative speed of a vehicle, equipped with the vehicle running mode detecting system, to a forward object on the basis of a time elapsed from a reference time based on which the time elapsed is measured and a change in the distance between the vehicle and the forward object during the time elapsed, a running mode determining means which determines a degree of acceleration or deceleration of the vehicle relative to the forward object and a variation in the distance between the vehicle and the forward object on the basis of the change in the distance between the vehicle and the forward object, and a reference time updating means which receives an output of the running mode determining means and updates the reference time more frequently as the degree of acceleration or deceleration of the vehicle increases.

* * * * *